US012733765B2

(12) United States Patent
Pegden

(10) Patent No.: US 12,733,765 B2
(45) Date of Patent: Sep. 15, 2026

(54) RELATING TO SHOWER RODS

(71) Applicant: NORCROS GROUP (HOLDINGS) LIMITED, Andover (GB)

(72) Inventor: Peter James Harold Pegden, Hull (GB)

(73) Assignee: NORCROS GROUP (HOLDINGS) LIMITED, Andover (GB)

( * ) Notice: Subject to any disclaimer, the term of this patent is extended or adjusted under 35 U.S.C. 154(b) by 524 days.

(21) Appl. No.: 18/011,950

(22) PCT Filed: Jul. 15, 2021

(86) PCT No.: PCT/GB2021/051819
§ 371 (c)(1),
(2) Date: Dec. 21, 2022

(87) PCT Pub. No.: WO2022/013559
PCT Pub. Date: Jan. 20, 2022

(65) Prior Publication Data

US 2023/0172381 A1 Jun. 8, 2023

(30) Foreign Application Priority Data

Jul. 16, 2020 (GB) ..................................... 2010998

(51) Int. Cl.

| | |
|---|---|
| ***A47H 1/142*** | (2006.01) |
| ***A47H 1/02*** | (2006.01) |
| ***A47H 1/022*** | (2006.01) |
| ***A47K 3/38*** | (2006.01) |
| ***F16B 47/00*** | (2006.01) |

(52) U.S. Cl.
CPC ............. *A47H 1/142* (2013.01); *A47H 1/022* (2013.01); *A47K 3/38* (2013.01); *F16B 47/003* (2013.01); *A47H 2001/0215* (2013.01)

(58) Field of Classification Search
CPC .......... A74H 1/142; A74H 1/022; A47K 3/38; F16B 47/003; A47H 2001/0215; A47H 99/00
USPC ....................................... 4/610; 211/119.009
See application file for complete search history.

(56) References Cited

U.S. PATENT DOCUMENTS

| | | | | |
|---|---|---|---|---|
| 420,486 A | | 2/1890 | Wyant | |
| 972,544 A | | 10/1910 | Otis | |
| 2,199,851 A | | 5/1940 | Culver | |
| 2,778,030 A | * | 1/1957 | Goche | A47K 3/38 403/383 |
| 2,974,806 A | | 3/1961 | Seewack | |
| 5,022,104 A | * | 6/1991 | Miller | A47K 3/38 4/558 |

(Continued)

FOREIGN PATENT DOCUMENTS

| | | |
|---|---|---|
| GB | 319128 A | 9/1929 |
| GB | 2530068 A | 3/2016 |

*Primary Examiner* — David P Angwin
*Assistant Examiner* — William R Klotz
(74) *Attorney, Agent, or Firm* — Dinsmore & Shohl LLP

(57) ABSTRACT

A shower rod assembly enhances the support provided by frictionally engaging the ends of a shower rod with facing walls. Support brackets are engaged with the external surface of the rod and fixed to the walls independently of the rod ends. Locking facilities are then provided which engage with the rod and the support brackets to bias the support brackets against the facing walls whilst also locking the rod in position.

12 Claims, 2 Drawing Sheets

(56) References Cited

U.S. PATENT DOCUMENTS

| | | | | |
|---|---|---|---|---|
| 5,894,610 | A * | 4/1999 | Winter | A47K 3/38<br>285/46 |
| 7,926,127 | B2 * | 4/2011 | Barrese | A47K 3/38<br>4/610 |
| 9,021,627 | B2 * | 5/2015 | Parker | A47K 3/38<br>211/105.4 |
| 11,889,958 | B2 * | 2/2024 | Moss | A47K 3/38 |
| 2014/0259368 | A1 | 9/2014 | Parker | |
| 2017/0238767 | A1 * | 8/2017 | Harold, Pegden | A47K 3/38 |
| 2018/0135849 | A1 * | 5/2018 | Paseta | F21V 15/012 |
| 2022/0228371 | A1 * | 7/2022 | Tooley | A47K 17/022 |

* cited by examiner

RELATING TO SHOWER RODS

CROSS-REFERENCE TO RELATED APPLICATIONS

This application is the U.S. National Stage of PCT/GB2021/051819 filed on Jul. 15, 2021, which claims priority to United Kingdom Patent Application 2010998.9 filed on Jul. 16, 2020, the entire content of both are incorporated herein by reference in their entirety.

FIELD OF THE INVENTION

This invention relates to a shower rod assembly that is mounted between walls or suitable mounting points in a bathroom to support a shower curtain.

BACKGROUND TO THE INVENTION

A popular form of shower rod is telescopically adjustable in length and is mounted by biasing the opposite ends outwardly and into frictional engagement with facing walls. An internal cam arrangement then locks the rod sections together when in the desired position. This arrangement has the advantage that it does not require perforation of the walls by screws or the like.

By and large the frictional engagement provided by this arrangement is satisfactory but, over time or when subjected to a lateral force, the frictional engagement can be overcome and the rod displaces out of position and typically becomes detached. Further, when the rod is dis-mounted, for example for cleaning, it is not always easy to re-position the rod in the same location.

It is an object of the invention to provide a shower rod that will go at least some way in addressing the drawbacks mentioned above; or which will at least provide a novel and useful alternative.

SUMMARY OF THE INVENTION

Accordingly, in one aspect, the invention provides method of securing a shower rod assembly between facing walls, the assembly comprising telescopically adjustable rod and support brackets, the rod having a rod axis, an external surface extending along the rod axis, and rod ends; the support brackets being configured to engage the external surface of said rod and to engage the facing walls, the method including the steps of setting the length of said rod to engage said rod ends with said facing walls; engaging said support brackets with the external surface of said rod, and fixing said support brackets to said facing walls independently of the rod ends, wherein the method further comprises engaging a locking facility between the rod and at least one of said support brackets, and displacing the locking facility relative to the rod to generate a force directed to bias said at least one of said support brackets against an adjacent facing wall.

Preferably the method comprises securing said support brackets to said facing walls using an adhesive.

Preferably the method comprises securing said support brackets to said facing walls using double-sided adhesive pad.

In a second aspect the invention provides a shower rod assembly for mounting a shower rod between facing walls, the assembly comprising a telescopically adjustable rod and support brackets, the rod having a rod axis, an external surface extending along the rod axis, and rod ends; the support brackets being configured to engage the external surface of said rod and having mounting surfaces configured to engage said facing walls independently of the rod ends, wherein the assembly further comprises a locking facility operatively connected to the rod and to at least one of said wall brackets, the configuration of the rod and locking facility being such that, in use, displacement of the locking facility relative to the rod generates a force directed to bias said at least one of said support brackets against an adjacent facing wall.

Preferably said pair of support brackets are configured to surround said end parts of said rod.

Preferably said pair of support brackets are configured for attachment to said facing walls by an adhesive.

Preferably said adhesive is provided as double-sided adhesive pad.

Preferably said rod includes a locking spigot extending outwardly from said external surface and said locking facility comprises a rotating sleeve having a base plate which, in use, bears against said one of said support brackets and a slot angled with respect to said rod axis, in use said locking spigot engaging in said angled slot in a manner such that that rotation of the slot relative to said spigot generates the force to bias the support bracket against the adjacent facing wall.

Preferably said rod ends are incorporated in end caps, said locking spigot being incorporated in an end cap.

Preferably said assembly further includes an O-ring engageable in an annular groove provided in a wall contact surface of said end cap.

Preferably a said locking facility is provided at both ends of said rod.

Preferably said assembly further includes a pair of decorative caps configured to overlie connections between said rod and said support brackets.

Many variations in the way the invention may be performed will present themselves to those skilled in the art, upon reading the following description. The description should not be regarded as limiting but rather as an illustration, only, of one manner of performing the invention. Within the scope of the appended claims, where possible and appropriate any element or component should be taken as including any or all equivalents thereof whether or not specifically mentioned.

BRIEF DESCRIPTION OF THE DRAWINGS

One working embodiment of the invention will now be described with reference to the accompanying drawings in which.

DETAILED DESCRIPTION OF WORKING EMBODIMENT

Figure 1:
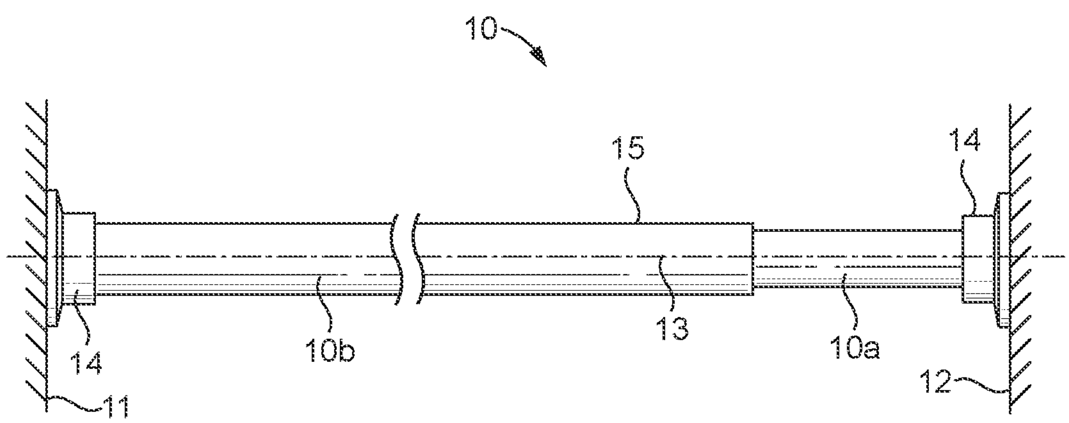
FIG. 1 shows a schematic view of a shower rod assembly according to the invention mounted between facing walls.

Referring firstly to FIG. 1, a hollow tubular shower curtain rod 10 is shown fixed between facing walls 11 and 12. The rod has a rod axis 13 extending along the axial centre-line of the rod and end parts of the rod 10 are located in support brackets 14 in a manner that will be described in greater detail below.

Figure 2:
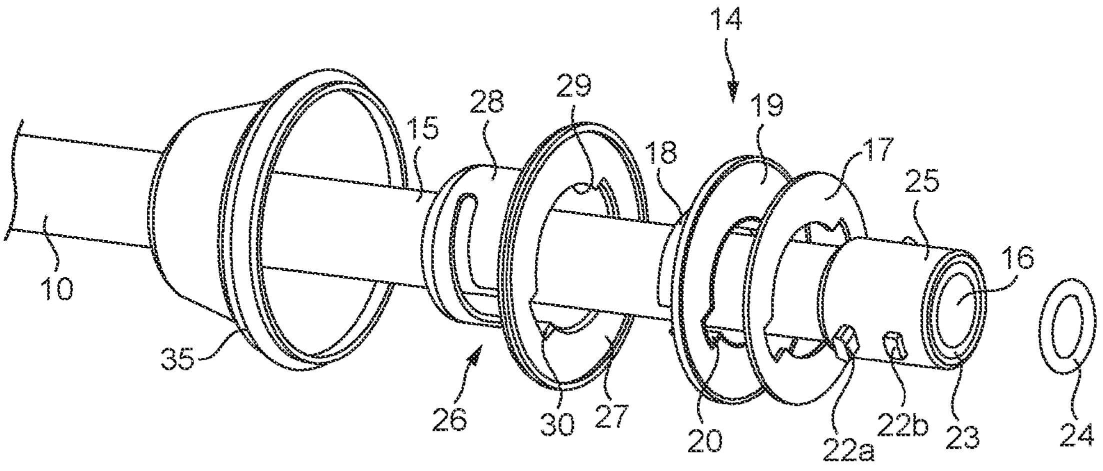
FIG. 2 shows an isometric exploded view of fixing components including a support bracket and locking facility located at one end of the rod.
Figure 3:
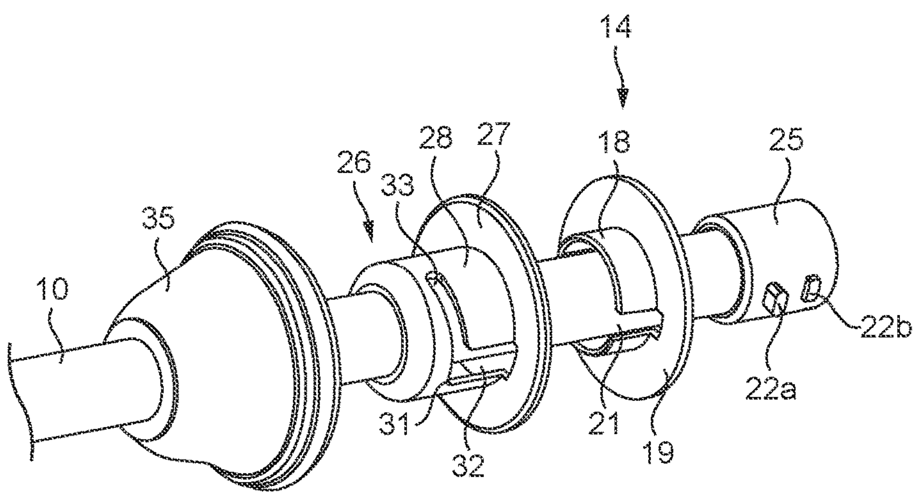
FIG. 3 shows a reverse isometric view of the fixing components shown in FIG. 2.

The rod 10 is telescopic and comprises sections 10*a* and 10*b* aligned along axis 13, section 10*a* being of reduced diameter relative to section 10*b* and being slidably retained within a section 10*b*. Suitable locking means (not shown) are provided in the known manner between the sections 10*a* and 10*b* so that the relative positions of the two sections can be set to maintain the rod ends 16 (FIG. 2) in engagement with walls 11 and 12. The rod has an external surface 15 extending between the rod ends 16 which, in the described embodiment, is arranged around and parallel to the rod axis 13.

The support brackets 14 are configured to engage the outer surface 15 of the rod 10 adjacent to the rod ends and are conveniently secured to the walls 11 and 12 by an adhesive, the adhesive being conveniently provided in the form of a double-sided adhesive pad 17. In the form shown, each support bracket 14 comprises a sleeve section 18 configured to slidingly receive the external surface 15 of the rod, and a mounting surface provided on one side of base plate 19, the mounting surface being configured to engage the walls 11 and 12 independently of the rod ends 16. The base plate 19 is preferably annular so that the bracket locates entirely around the external surface 15 of the rod.

Identical support brackets 14 are preferably, but not necessarily, provided at each end of the rail. As shown, the base plate 19 of at least one of the support brackets 14 includes a notch 20 which is aligned with a slot 21 extending axially along the wall of the sleeve section 18, the sleeve 18 and slot 21, when mounted on rod 10, extending parallel to the rod axis 13.

A particular feature of the invention is that a locking facility is provided between at least one of the support brackets 14, and the rod 10, that allows the rod to be located and supported in position and, while so supported, to be locked in position. The locking facility is provided in part on the rod, bears against the support bracket, and includes a displacement function which, in use, generates a locking force along the axis 13 which biases the respective support bracket against the adjacent wall. A further feature is that the locking force is preferably applied against a compressible medium, in this case adhesive pad 17. This has the added advantage that the pad also serves to secure the support brackets 14 but alternatives could be provided. For example, the apparatus could be configured so that the locking facility acts against a spring or other compressible member or surface.

The locking facility will now be described with reference to one end of the rod 10, those skilled in the art recognising that a duplicate facility will, in most cases, also be provided at the other end of the rod.

In the shown embodiment the rod 10 is provided with a first or locking spigot 22*a* that projects from the external surface 15 of the rod adjacent to, but spaced from, the end of the rod. The spigot 22*a* is preferably incorporated in a rod end cap 25 and is sized so that notch 20 and slot 21 can be displaced over the first spigot 22*a*, and also over second spigot 22*b*. The rod end 16, being the outwardly directed end face of the end cap 21, preferably includes a circular groove 23 which, in use, locates a rubber or other compressible O-ring 24.

To provide the locking facility the first spigot 22*a* acts in conjunction with a displaceable, preferably rotating, locking member 26, the locking member 26 comprising a pressure plate 27 configured to bear against base plate 19 of the support bracket, and a sleeve 28 extending from the pressure plate 27. The pressure plate 27 includes a central aperture 29 that is sized to be a sliding fit over sleeve 18 of the support bracket 14. In a similar fashion to base plate 19 of the support bracket 14, the pressure plate 27 includes a notch 30 sized to fit over spigot 22*a*, and a slot 31 formed in sleeve 28 that is aligned with the notch 29. It will be noted that slot 31 has a first section 32 extending from notch 29 parallel to axis 13, the section 32 merging into a second slot section 33 that extends circumferentially of sleeve 28 but is angled outwardly with respect to axis 13.

In use, the support bracket 14, adhesive pad 17, and locking member 26 are loosely assembled on the rod 10 and the rod positioned in place by extending section 10*a* relative to section 10*b* until the rod can be supported against gravity by frictional interaction of O-rings 24 with the respective adjacent wall surfaces 11 and 12. At this stage rod sections 10*a* and 10*b* are locked together in the known manner. With the rod in the desired position, the protective layer of the adhesive pads 17 is removed, the notch 20 of support bracket 14 aligned with spigots 22*a* and 22*b* and the support bracket then displaced over end cap 25 until base plate 19 of the support bracket is secured to the wall by the adhesive pad 17. With the base plate 19 in position against the wall, the support bracket is prevented from rotation relative to the rod 10 by engagement of the slot 21 with the second spigot 22*b*, the height of the second spigot 22*b* being less than that of spigot 22*a* to enable the locking member 26 to rotate over the support bracket 14.

Figure 4:
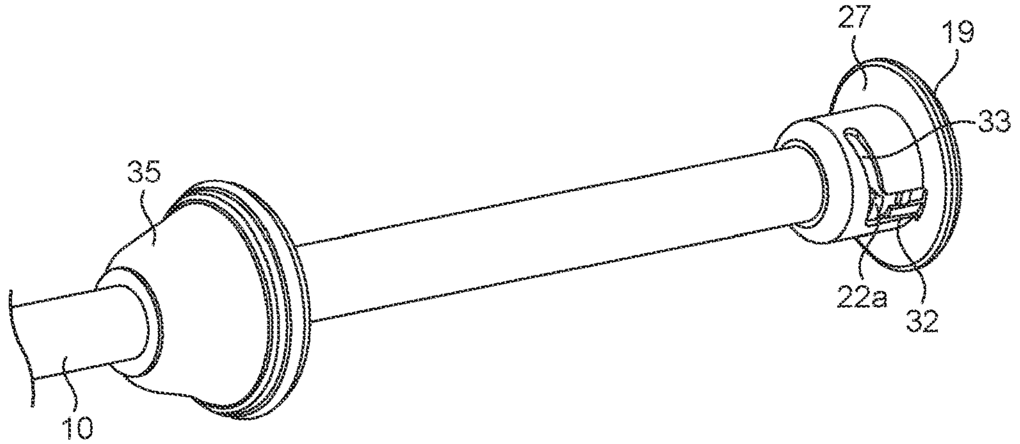
FIG. 4 shows the components of FIGS. 2 & 3 assembled in a first or engaging position.
Figure 5:
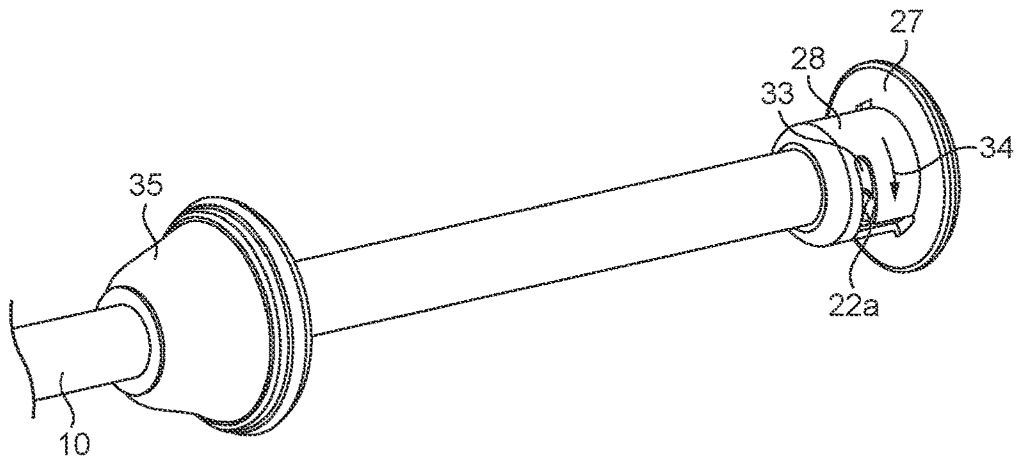
FIG. 5 shows a similar view to FIG. 4 but with the components in a second or locking position.

With the support bracket 14 secured in place, notch 30 in the pressure plate 27 is aligned with the spigot 22*a* and the pressure plate passed over sleeve 18 of the support bracket and over the end cap 25 until spigot 22*a* reaches the end of slot section 32 and is aligned with slot section 33. This is shown in FIG. 4 and it should be appreciated that the lengths of sleeves 18 and 28, and the positioning of spigot 22*a* on end cap 25 are all set so that, when the components are in the positions shown in FIG. 4, pressure plate 27 is firmly located against base plate 19 of the support bracket 14. The locking member 26 is then rotated relative to the support bracket 14 in the direction of arrow 34 in FIG. 5. This causes the spigot 22*a* to enter second slot sections 33. Upon further rotation of the locking member 26 as shown in FIG. 5 the inclined edges of slot section 33 act against spigot 22*a* thereby biasing the support bracket 14 against the adjacent facing wall surface.

Once the rod 10 and support brackets 14 have been firmly secured by application of the locking facility, decorative caps 35, also pre-assembled on the rod, may be displaced to overlie the support brackets and locking facility, and be engaged with the support brackets 14 or locking members 26.

It will thus be appreciated that the invention provides a relatively simple yet effective form of shower curtain rod assembly, and/or a method of mounting a shower curtain rod, and/or a method and apparatus for supplementing the mounting of a shower curtain rod which is simple to implement yet is highly effective in use.

The invention claimed is:

1. A method of securing a shower rod assembly between facing walls, the shower rod assembly comprising:

a telescopically adjustable rod and support brackets, the rod having a rod axis, an external surface extending along the rod axis, and rod ends; and the support brackets being configured to engage the external surface of the rod and to engage the facing walls;

the method comprising:

setting a length of the rod to contact the rod ends with the facing walls;

engaging the support brackets with the external surface of the rod;

fixing the support brackets to the facing walls independently of the rod ends; and once the rod is engaged with the support brackets, operatively connecting a locking facility to the rod and to at least one of the support brackets, and displacing the locking facility relative to the rod to generate a force directed to bias the at least one of the support brackets against an adjacent one of the facing walls.

2. The method as claimed in claim 1, comprising securing the support brackets to the facing walls using an adhesive.

3. The method as claimed in claim 1, comprising securing the support brackets to the facing walls using double-sided adhesive pad.

4. A shower rod assembly for mounting between facing walls, the shower rod assembly comprising:

a telescopically adjustable rod and a plurality of support brackets, the rod having a rod axis, an external surface extending along the rod axis, and rod ends directly engageable with the facing walls, the support brackets being engageable with the external surface of the rod while allowing the rod ends to contact the facing walls and having mounting surfaces engageable with the facing walls independently of the rod ends; and a locking facility operatively connected to the rod and to at least one of the support brackets, wherein a displacement of the locking facility relative to the rod generates a force directed to bias the at least one of the support brackets against an adjacent one of the facing walls.

5. The shower rod assembly as claimed in claim 4, wherein the support brackets surround the rod ends.

6. The shower rod assembly as claimed in claim 4, further comprising an adhesive disposed between the at least one of the support brackets and the adjacent one of the facing walls.

7. The shower rod assembly as claimed in claim 6, wherein the adhesive is provided as a double-sided adhesive pad.

8. The shower rod assembly as claimed in claim 4, wherein:

the rod includes a locking spigot extending outwardly from the external surface, the locking facility comprises a rotating sleeve having a base plate which, in use, bears against the one of the support brackets and a slot angled with respect to the rod axis, and the locking spigot engaging in the slot when installed to generate the force to bias the at least one of the support brackets against the adjacent one of the facing walls upon rotation of the slot relative to the locking spigot.

9. The shower rod assembly as claimed in claim 8, wherein the rod ends are incorporated in end caps, the locking spigot being incorporated in one of the end caps.

10. The shower rod assembly as claimed in claim 9, further including an O-ring engageable in an annular groove defined in a wall contact surface of each of the end caps.

11. The shower rod assembly as claimed in claim 4, wherein the locking facility is provided at both ends of the rod.

12. The shower rod assembly as claimed in claim 4, further including a pair of decorative caps overlying connections between the rod and the support brackets.

* * * * *